United States Patent
Kashiwagi et al.

(10) Patent No.: US 8,456,737 B2
(45) Date of Patent: Jun. 4, 2013

(54) AMPLIFICATION OPTICAL FIBER AND OPTICAL FIBER AMPLIFIER AND RESONATOR USING THE SAME

(75) Inventors: Masahiro Kashiwagi, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 388 days.

(21) Appl. No.: 12/985,491

(22) Filed: Jan. 6, 2011

(65) Prior Publication Data
US 2012/0105947 A1  May 3, 2012

(30) Foreign Application Priority Data
Nov. 2, 2010  (JP) .................................. 2010-246360

(51) Int. Cl.
*H04B 10/17* (2006.01)
*H04B 10/12* (2006.01)

(52) U.S. Cl.
USPC ........................................ 359/341.1; 372/6

(58) Field of Classification Search
USPC ........................................ 359/341.1; 372/6
See application file for complete search history.

(56) References Cited

U.S. PATENT DOCUMENTS

| 5,121,460 A | * | 6/1992 | Tumminelli et al. | .......... 385/126 |
| 5,818,630 A | | 10/1998 | Fermann et al. | |
| 5,966,481 A | * | 10/1999 | Jolley et al. | ............ 385/28 |

OTHER PUBLICATIONS

Quimby et al. "Yb3+ Ring Doping in High-Order-Mode Fiber for High-Power 977-nm Lasers and Amplifiers", IEEE Journal of selected topics in quantum electronics, vol. 15, No. 1, pp. 12-19 (Feb. 2009).*

Farrow et al. "Design of refractive-index and rare-earth-dopant distributions for large-mode-area fibers used in coiled high-power amplifiers", Proceedings of the SPIE, p. 64531C (11) (Jan. 2007).*

* cited by examiner

*Primary Examiner* — Eric Bolda
(74) *Attorney, Agent, or Firm* — Westerman, Hattori, Daniels & Adrian, LLP (57) ABSTRACT

The invention provides an amplification optical fiber, which can output light with a good beam quality even when a higher-order mode is excited, and an optical fiber amplifier using the amplification optical fiber.

An amplification optical fiber 50 has a core 51 and a clad 52 covering the core 51. The core 51 propagates light with a predetermined wavelength in at least an LP01 mode, and an LP02 mode, and an LP03 mode. When the LP01 mode, the LP02 mode, and the LP03 mode are standardized by power, in at least a part of a region where the intensity of the LP01 mode is larger than at least one of the intensities of the LP02 mode and the LP03 mode, the active element is added to the core 51 at a higher concentration than the central portion of the core.

12 Claims, 7 Drawing Sheets

AMPLIFICATION OPTICAL FIBER AND OPTICAL FIBER AMPLIFIER AND RESONATOR USING THE SAME

TECHNICAL FIELD

The invention relates to an amplification optical fiber, and an optical fiber amplifier and a resonator using the amplification optical fiber, and particularly to an amplification optical fiber, which can improve the beam quality, and an optical fiber amplifier and a resonator using the amplification optical fiber.

BACKGROUND ART

As one of the fiber laser devices used in, for example, a processing machine and medical equipment, there has been known an MO-PA (Master Oscillator-Power Amplifier) fiber laser device which amplifies light, generated by a seed light source such as a laser oscillator (MO: Master Oscillator), by an amplifier (PA: Power Amplifier) and outputs the light. As an amplifier used in the amplifier, there has been known an optical fiber amplifier which amplifies light by an amplification optical fiber.

The amplification optical fiber generally uses a double-clad fiber in which an active element such as a rare-earth element is added to the core. The double-clad fiber includes a double-clad fiber whose core propagates only single mode light and a double-clad fiber whose core propagates multi-mode light. In the double-clad fiber whose core propagates only single mode light, the cross-sectional area of the core is small, and therefore, if a high power laser output is to be obtained, the density of light propagating through the core may be excessively increased. In this case, the energy of light is transferred to an undesired wavelength by a nonlinear optical effect, and an expected laser output may not be obtained. Thus, with the recent requirements for realization of high output of an optical fiber amplifier, an optical fiber amplifier using the double-clad fiber whose core propagates multi-mode light has attracted attention.

In the optical fiber amplifier, it is preferable in terms of improving the beam quality of output light that an LP01 mode of propagating light be amplified, and other higher-order modes not be amplified. In the following patent documents, examples of such an optical fiber amplifier are described. In the optical fiber amplifier, a mode converter which excites only the LP01 mode of light is provided, whereby amplification can be performed around the LP01 mode even in an amplification double-clad fiber which propagates multi-mode light. Patent Document 1 further suggests that by using an amplification optical fiber in which an active element is added to the central portion of the core of the double-clad fiber, and the active element is not added to an outer peripheral portion of the core, the LP01 mode is amplified more effectively than higher-order modes by the effect of a gain guided wave.

Patent Document 2 describes the following idea. That is, by using an amplification optical fiber in which an active element is added to the central portion of the core of the double-clad fiber, and an absorption element absorbing light is added to an outer peripheral portion of the core, unnecessary higher-order modes are attenuated.

[Patent Document 1] U.S. Pat. No. 5,818,630
[Patent Document 2] U.S. Pat. No. 5,121,460

SUMMARY OF THE INVENTION

However, if the double-clad fiber which can propagate light in multi-mode is used as an amplification optical fiber, in propagating light, not only the LP01 mode (fundamental mode) but also the higher-order mode such as an LP02 mode is excited. The existence of the higher-order mode reduces the beam quality of output light and, for example, the output light is less likely to be collected.

In order to excite only the LP01 mode using the mode converter described in Patent Document 1, a shape of a mode field of input seed light and a shape of the mode field of the LP01 mode of light propagating an amplification double-clad fiber are required to coincide with each other. According to the knowledge of the present inventors, although it is relatively easy to prevent an LP11 mode, which is an asymmetric mode among the higher-order modes, from being excited, the LP02 mode and an LP03 mode which are axisymmetric modes are easily excited. According to further findings of the present inventors, in the higher-order modes such as the LP02 mode and the LP03 mode, when the power is minimal at the time of inputting, or when it is generated in an amplification optical fiber, the higher-order mode is amplified at higher rate than the LP01 mode in general, and therefore, the higher-order mode accounts for high rate in output light. It is found that as a light amplification factor is higher, the higher-order mode is amplified at higher rate, so that the beam quality of output light tends to be reduced.

When the optical fiber amplifier described in Patent Document 2 is used, even if an axisymmetric higher-order mode is excited, it is predicted that the mode is attenuated. However, since an attenuating material is added to an amplifying medium, the gain of the LP01 mode is reduced, and therefore, there is a problem that a sufficient output cannot be obtained.

Thus, an object of the invention is to provide an amplification optical fiber, which can output light with a good beam quality even when a higher-order mode is excited, and an optical fiber amplifier and a resonator using the amplification optical fiber.

The present inventors conducted intensive studies that when light including the LP01 mode, the LP02 mode, and the LP03 mode propagates through a core of an optical fiber, how the LP01 mode, the LP02 mode, and the LP03 mode are distributed and amplified in the radial direction of the core. As a result, it is found that in the central portion of the core, the LP02 mode and the LP03 mode have larger intensity than the LP01 mode. Accordingly, if an active element is uniformly added in the radial direction of the core, or if a high concentration of active element is added to the central portion of the core, the LP02 mode and the LP03 mode are amplified at a high amplification factor, as described above. Consequently, the beam quality of output light is deteriorated. Thus, the present inventors conducted further intensive studies to make the present invention.

That is, the amplification optical fiber of the invention has a core and a clad covering the core. The amplification optical fiber is characterized in that the core propagates light with a predetermined wavelength in at least the LP01 mode, the LP02 mode, and the LP03 mode. When the LP01 mode, the LP02 mode, and the LP03 mode are standardized by power, in at least a part of a region where the intensity of the LP01 mode is larger than at least one of the intensities of the LP02 mode and the LP03 mode, an active element inducing and emitting the light with a predetermined wavelength is added to the core at a higher concentration than a central portion of the core, and at least one of the following formulae (1) and (2) is satisfied:

$$\int_0^b n(r) \times \{I_{01}(r) - I_{02}(r)\} r\, dr > 0 \quad (1)$$

$$\int_0^b n(r) \times \{I_{01}(r) - I_{03}(r)\} r\, dr > 0 \quad (2)$$

(where r represents a distance from the center in the radial direction of the core, $I_{01}(r)$ represents intensity in the distance r from the center in the radial direction of the core in the LP01 mode, $I_{02}(r)$ represents intensity in the distance r from the center in the radial direction of the core in the LP02 mode, $I_{03}(r)$ represents intensity in the distance r from the center in the radial direction of the core in the LP03 mode, n(r) represents an additive concentration of the active element in the distance r from the center in the radial direction of the core, and b represents a radius of the core.)

In the invention, in the region where the intensity of the LP01 mode is larger than at least one of the intensities of the LP02 mode and the LP03 mode, the active element is added at a higher concentration than the central portion of the core. In the region where the active element is added at a higher concentration than the central portion of the core, light is amplified at a higher amplification factor than the central portion of the core. Relative to the central portion of the core where the intensities of the LP02 mode and the LP03 mode are larger than the intensity of the LP01 mode, light is amplified at a higher amplification factor in the region where the intensity of the LP01 mode is larger than at least one of the intensities of the LP02 mode and the LP03 mode, whereby the LP01 mode can be amplified at a higher amplification factor than at least one of the LP02 mode and the LP03 mode. In order to satisfy at least one of the formulae (1) and (2), the LP01 mode can be amplified at a higher amplification factor than one of the LP02 mode and the LP03 mode as the entire fiber, and therefore, the beam quality of output light can be improved.

In the amplification optical fiber, it is preferable that when the LP01 mode, the LP02 mode, and the LP03 mode are standardized by power, in at least a part of a region where the intensity of the LP01 mode is larger than the intensity of the LP02 mode and in at least a part of a region where the intensity of the LP01 mode is larger than the intensity of the LP03 mode, the active element is added to the core at a higher concentration than the central portion of the core, and the formulae (1) and (2) are satisfied.

In the amplification optical fiber, the LP01 mode is amplified higher than the LP02 mode in the region where the intensity of the LP01 mode is larger than the intensity of the LP02 mode. The LP01 mode is amplified higher than the LP03 mode in the region where the intensity of the LP01 mode is larger than the intensity of the LP03 mode. The formulae (1) and (2) are satisfied, whereby the LP01 mode is amplified at a higher amplification factor than the LP02 mode and the LP03 mode. Thus, the beam quality can be further improved.

In the amplification optical fiber, it is preferable that when the LP01 mode, the LP02 mode, and the LP03 mode are standardized by power, in at least a part of a region where the intensity of the LP01 mode is larger than the intensities of the LP02 mode and the LP03 mode, the active element is added to the core at a higher concentration than the central portion of the core.

According to the amplification optical fiber, since the active element only needs to be added to at least a part of the region where the intensity of the LP01 mode is larger than the intensities of the LP02 mode and the LP03 mode, the active element can be efficiently added so that the LP01 mode is amplified at a higher amplification factor than the LP02 mode and the LP03 mode.

In the amplification optical fiber, it is preferable that when the LP01 mode, the LP02 mode, and the LP03 mode are standardized by power, in all regions where the intensity of the LP01 mode is larger than the intensities of the LP02 mode and the LP03 mode, the active element is added to the core at a higher concentration than the central portion of the core.

According to the amplification optical fiber, the beam quality can be further improved.

In the amplification optical fiber, it is preferable that when the LP01 mode, the LP02 mode, and the LP03 mode are standardized by power, in all regions where the intensity of the LP01 mode is larger than at least one of the intensities of the LP02 mode and the LP03 mode, the active element is added to the core at a higher concentration than the central portion of the core, and the formulae (1) and (2) are satisfied.

According to the amplification optical fiber, the LP01 mode is amplified at a high amplification factor in all the regions where the intensity of the LP01 mode is larger than at least one of the intensities of the LP02 mode and the LP03 mode. Accordingly, the beam quality of output light can be further improved.

In the amplification optical fiber, it is preferable that the active element is not added to the central portion of the core.

According to the amplification optical fiber, since light is not amplified at the central portion of the core where the intensities of the LP02 mode and the LP03 mode are larger than the intensity of the LP01 mode, the beam quality of output light can be further improved.

In the amplification optical fiber, it is preferable that in the outer peripheral portion of the core, the concentration of the active element is lower than that in a region where the active element is added at a higher concentration than the central portion of the core.

According to further findings of the present inventors, in the above consideration, the intensities of the LP02 mode and the LP03 mode are larger than the intensity of the LP01 mode in the outer peripheral portion of the core. Accordingly, according to the amplification optical fiber, in the outer peripheral portion where the intensities of the LP02 mode and the LP03 mode are larger than the intensity of the LP01 mode, the amplification factor of the LP02 mode and the LP03 mode can be kept lower than the amplification factor of the LP01 mode, and therefore, the beam quality of output light can be further improved.

Further, in the amplification optical fiber, it is preferable that the active element is not added to the outer peripheral portion of the core.

According to the amplification optical fiber, the beam quality of output light can be further improved.

An optical fiber amplifier of the invention includes the above amplification optical fiber, a seed light source which inputs seed light including an LP01 mode to the amplification optical fiber, and a pumping light source which outputs pumping light pumping the active element of the amplification optical fiber.

According to the optical fiber amplifier, even when the LP02 mode and the LP03 mode are excited, the LP01 mode is amplified at a higher amplification factor, and therefore, light with a good beam quality can be output.

Further, in the optical fiber amplifier, it is preferable that the seed light input to the amplification optical fiber excites only an axisymmetric mode of the amplification optical fiber.

According to the optical fiber amplifier, since a nonaxisymmetric higher-order mode does not propagate in an amplification optical fiber, the nonaxisymmetric higher-order mode is not amplified and output; therefore, easily collectable light with a good beam quality can be output.

In the optical fiber amplifier, it is preferable that the seed light input to the amplification optical fiber is single mode light.

According to the optical fiber amplifier, in an amplification optical fiber propagating multi-mode light, the nonaxisymmetric higher-order mode and light of the higher-order mode are less likely to be excited, and therefore, easily collectable light with a good beam quality can be output.

A resonator of the invention includes the amplification optical fiber described above, a pumping light source which outputs pumping light pumping the active element of the amplification optical fiber, a first FBG (Fiber Bragg Grating) which is provided on one side of the amplification optical fiber and reflects light with at least a part of a wavelength of light emitted by the active element pumped by the pumping light, and a second FBG which is provided on the other side of the amplification optical fiber and reflects light with the same wavelength as the light, reflected by the first FBG, at a lower reflectance than the first FBG.

According to the resonator, in the resonance of light, when light propagates through the core of the amplification optical fiber, the LP01 mode is amplified higher than the LP02 mode and the LP03 mode. Therefore, in comparison with a case of using a fiber in which the active element is added to the core at a uniform concentration, it is possible to output light with a good beam quality in which the intensity of the LP01 mode is larger than the intensities of the LP02 mode and the LP03 mode.

As described above, according to the invention, there is provided an amplification optical fiber, which can output light with a good beam quality even when a higher-order mode is excited, and an optical fiber amplifier and a resonator using the amplification optical fiber.

BEST MODE FOR CARRYING OUT THE INVENTION

Hereinafter, preferred embodiments of an amplification optical fiber, an optical fiber amplifier, and a resonator according to the invention will be described in detail with reference to the drawings.

First Embodiment

Figure 1:
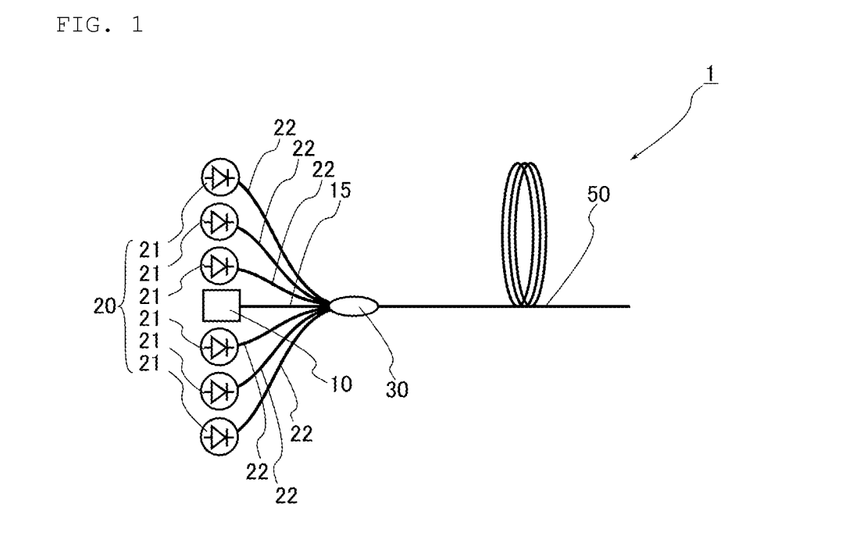
FIG. 1 is a view showing an optical fiber amplifier according to a first embodiment of the invention.

FIG. 1 is a view showing an optical fiber amplifier according to a first embodiment of the invention.

As shown in FIG. 1, an optical fiber amplifier 1 in this embodiment mainly includes a seed light source 10 outputting light as seed light, a pumping light source 20 outputting pumping light, an optical combiner 30 to which the seed light and the pumping light are input, and an amplification optical fiber 50. The seed light and the pumping light output from the optical combiner 30 are input to the amplification optical fiber 50, and an active element pumped by the pumping light is added to the amplification optical fiber 50.

The seed light source 10 is constituted of, for example, a semiconductor laser device and a Fabry-Perot type or fibering type fiber laser device. The seed light source 10 is configured to output light including an LP01 mode from an optical fiber. Although the seed light output from the seed light source 10 is not limited especially as long as it is the light including the LP01 mode, the seed light has a wavelength that allows the active element, added to the amplification optical fiber 50, to be induced and emitted. For example, when the active element is ytterbium (Yb), laser light with a wavelength of 1070 nm is used.

The output light of the seed light source 10 is output from a single mode fiber 15 constituted of a core and a clad covering the core. The single mode fiber 15 propagates, as the single mode light in the LP01 mode, the light output from the seed light source 10. The constitution of the single mode fiber 15 is not limited especially. However, for example when the wavelength of the seed light is 1070 nm as described above, a diameter of the core is 10 μm, and a relative refractive index difference between the core and the clad is 0.13%.

The pumping light source 20 is constituted of a plurality of laser diodes 21. In this embodiment, the laser diode 21 is, for example, a Fabry-Perot type semiconductor laser formed of a GaAs-based semiconductor and outputs light with a central wavelength of 915 nm. Each of the laser diodes 21 of the pumping light source 20 is connected to a multi-mode fiber 22. The pumping light output from the laser diode 21 propagates as multi mode light through the multi-mode fiber 22.

In the optical combiner 30 connected to the multi-mode fiber 22 and the single mode fiber 15, a portion where the multi mode fibers are arranged around the single mode fiber 15 is melted and extended to be integrated, and the optical combiner 30 is optically connected to the amplification optical fiber 50.

Figure 2:
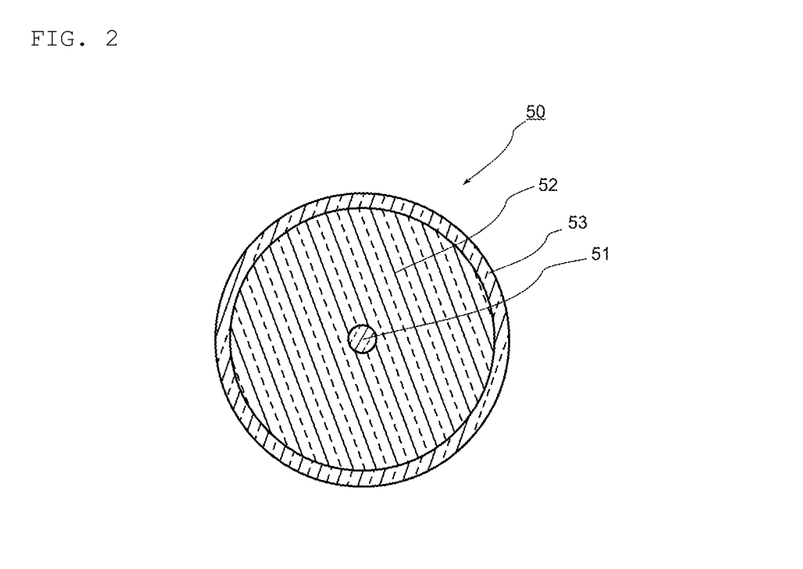
FIG. 2 is a view showing a structure in a cross-section vertical to the longitudinal direction of the amplification optical fiber of FIG. 1.

FIG. 2 is a view showing a structure of the amplification optical fiber 50 in a cross-section vertical to the longitudinal direction of the amplification optical fiber 50. As shown in FIG. 2, the amplification optical fiber 50 is constituted of a core 51, a clad 52 covering the core 51, and an external clad 53 covering the clad 52. The refractive index of the clad 52 is lower than the refractive index of the core 51, and the refractive index of the external clad 53 is lower than the refractive index of the clad 52. For example, in this embodiment, the relative refractive index difference between the core 51 and the clad 52 is 0.32%. A diameter of the core 51 is 30 μm, for example. An outer diameter of the clad 52 is 420 μm, for example. An outer diameter of the external clad 53 is 440 μm, for example. The core 51 is formed of, for example, quartz to which an element such as aluminum increasing the refractive index of quartz is added, and ytterbium (Yb) as an active element which is in a pumped state by the pumping light output from the pumping light source 20 is added to at least a part of a region of the core 51. Examples of such an active element include not only ytterbium (Yb) but also a rare-earth element such as neodymium (Nd) and erbium (Er). Examples of the active element further include bismuth (Bi) and chrome (Cr) in addition to the rare-earth element. The clad 52 is formed of, for example, quartz to which dopant is not added. The external clad 53 is formed of, for example, an ultraviolet curable resin.

By virtue of the above refractive index difference between the core 51 and the clad 52, light with a predetermined wavelength from the seed light source is confined into the core 51 and propagates. The mode of light propagating through the core 51 includes not only the LP01 mode as a fundamental mode but also the LP02 mode and the LP03 mode as higher-order modes. In the amplification optical fiber 50 according to this embodiment, the wavelength of the light of the seed light source, the dimensions of the core 51 and the clad 52, and the relative refractive index difference between the core 51 and the clad 52 are set so that higher-order modes of LP04 or more do not propagate. In order to set them so that the higher-order modes of LP04 or more do not propagate, for example, as described above, it is only necessary that the wavelength of the seed light be 1070 nm, the diameter of the core 51 be 30 μm, and the relative refractive index difference between the core 51 and the clad 52 be 0.32%.

Figure 3:
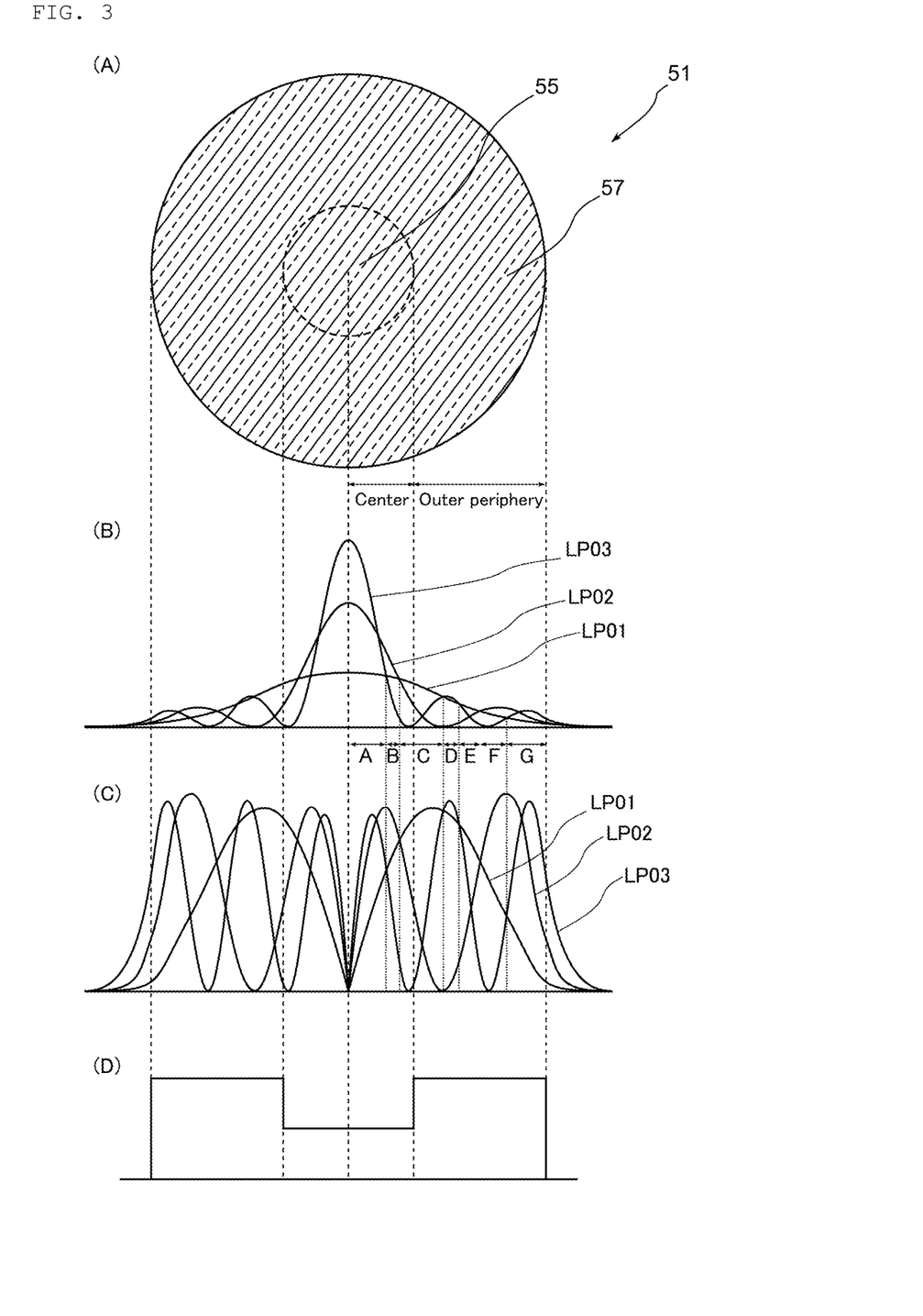
FIG. 3 is a view showing a state of a core of the amplification optical fiber of FIG. 2.

Next, the core 51 of the amplification optical fiber 50 will be described in more detail. FIG. 3 is a view showing a state of the core 51 of the amplification optical fiber 50 shown in FIG. 2. Specifically, FIG. 3A is a view showing the structure of the core 51 in a cross-section vertical to the longitudinal direction of the amplification optical fiber 50. FIG. 3B is a view showing distribution of the intensity per standardized unit area in the LP01 mode, the LP02 mode, and the LP03 mode propagating through the core 51. In FIG. 3C, the intensities of the LP01 mode, the LP02 mode, and the LP03 mode propagating through the core 51 are integrated by an area, and standardized power distribution is shown. FIG. 3D is a view showing a state of concentration distribution of the active element added to the core 51.

As shown in FIG. 3B, each mode has the intensity distribution that is the strongest at the center of the core 51. At the center of the core 51, the LP03 mode has the largest intensity, the LP02 mode has the second largest intensity, and the LP01 mode has the smallest intensity. As it is farther away from the center of the core 51 in the radial direction, the intensity of the LP01 mode is larger than the intensity of the LP03 mode. As shown in FIG. 3, in a region A ranging from the center of the core 51 in the radial direction of the core 51, the intensity of the LP01 mode is smaller than the intensity of the LP03 mode. When it is further away from the center of the core 51 in the radial direction, the intensity of the LP01 mode is larger than the intensities of the LP02 mode and the LP03 mode. In a region B on the outer peripheral side of the region A, the intensity of the LP01 mode is smaller than the intensity of the LP02 mode and larger than the intensity of the LP03 mode. When it is further away from the center of the core 51 in the radial direction, the intensity of the LP03 mode is temporarily larger than the intensity of the LP01 mode. In a region C on the outer peripheral side of the region B, the intensity of the LP03 mode is temporarily smaller than the intensity of the LP01 mode. In a region D, the intensity of the LP03 mode is temporarily larger than the intensity of the LP01 mode. When it is further away from the center of the core 51 in the radial direction, on the outer peripheral side of the region D, the intensity of the LP01 mode is larger than the intensities of the LP02 mode and the LP03 mode. In a region E on the outer peripheral side of the region D, the intensity of the LP01 mode is larger than the intensities of the LP02 mode and the LP03 mode. On the further outer peripheral side of the region E, the intensity of the LP02 mode is larger than the intensity of the LP01 mode, and on the still further outer peripheral side, the intensity of the LP01 mode is smaller than the intensities of the LP02 mode and the LP03 mode. In a region F on the outer peripheral side of the region E, the intensity of the LP01 mode is smaller than the intensity of the LP02 mode and is larger than the intensity of the LP03 mode. A region on the outer peripheral side of the region F is a region G.

When each region is defined as described above, the region A has a circular shape in the cross-section vertical to the longitudinal direction of the core 51, and the other regions B to G are distributed in the form of a ring. For example when the diameter of the core 51 is 30 μm as described above, a distance from the center to a boundary between the region A and the region B is about 3 μm, a distance from the center to a boundary between the region B and the region C is about 4 μm, a distance from the center to a boundary between the region C and the region D is about 7 μm, a distance from the center to a boundary between the region D and the region E is about 8.5 μm, a distance from the center to a boundary between the region E and the region F is about 10 μm, and a distance from the center to a boundary between the region F and the region G is about 12 μm.

In the regions A and G, the intensity of the LP01 mode is smaller than the intensities of the LP02 mode and the LP03 mode. In the regions B, C, and F, the intensity of the LP01 mode is larger than one of the intensities of the LP02 mode and the LP03 mode. In the regions C and E, the intensity of the LP01 mode is larger than the intensities of the LP02 mode and the LP03 mode.

The above relationship of the intensity between the LP01 mode, the LP02 mode, and the LP03 mode is similar in the distribution shown in FIG. 30.

When the LP01 mode, the LP02 mode, and the LP03 mode are standardized by power, in at least a part of the region where the intensity of the LP01 mode is larger than at least one of the intensities of the LP02 mode and the LP03 mode, an active element is added to the core 51 at a higher concentration than the central portion of the core. That is, in at least some ring-shaped regions among the regions B to F, Yb as one of the active elements is added at a higher concentration than the central portion of the core 51.

The active element is added so as to satisfy the following formulae (1) and (2):

$$\int_0^b n(r) \times \{I_{01}(r) - I_{02}(r)\} r\, dr > 0 \quad (1)$$

$$\int_0^b n(r) \times \{I_{01}(r) - I_{03}(r)\} r\, dr > 0 \quad (2)$$

In the above formulae (1) and (2), r represents a distance from the center in the radial direction of the core 51. $I_{01}(r)$ represents intensity in the distance r from the center in the radial direction of the core 51 in the LP01 mode shown in FIG. 3B. $I_{02}(r)$ represents intensity in the distance r from the center in the radial direction of the core 51 in the LP02 mode shown in FIG. 3B. $I_{03}(r)$ represents intensity in the distance r from the center in the radial direction of the core 51 in the LP03 mode shown in FIG. 3B. n(r) represents an additive concentration of the active element in the distance r from the center in the radial direction of the core 51. b represents a radius of the core 51. The unit of r is (m). Each unit of $I_n(r)$, $I_{02}(r)$, and $I_{03}(r)$ is (W/m$^2$). The unit of n(r) is (piece/m$^3$). The unit of b is (m).

In this embodiment, as shown in FIG. 3A, the active element Yb of $8 \times 10^{25}$ (pieces/m$^3$) is added to a center region 55 including the center of the core 51, and the active element Yb of $16 \times 10^{25}$ (pieces/m$^3$) is added to an outer peripheral region 57 outside the center region 55. A boundary between the center region 55 and the outer peripheral region 57 is included in the region C.

That is, when the LP01 mode, the LP02 mode, and the LP03 mode are standardized by power, the additive concentration of the active element Yb in the regions C and E where the intensity of the LP01 mode is larger than the intensities of the LP02 mode and the LP03 mode is higher than the additive concentration of the active element Yb in the center region 55 at the central portion of an active core.

The additive concentration of the active element Yb in the center region 55 and the additive concentration of the active element Yb in the outer peripheral region 57 are set so as to satisfy the relation of the formulae (1) and (2). That is, if the additive concentration distribution of the active element in the core 51 satisfies the relation of the formulae (1) and (2), the LP01 mode can be amplified at a higher amplification factor than the LP02 mode and the LP03 mode, and the beam quality of output light can be improved.

As described above, the invention has the following features. That is, in order to satisfy the relation of the formulae (1) and (2), when the LP01 mode, the LP02 mode, and the LP03 mode are standardized by power, the active element is added at a higher concentration than the central portion of the core in at least a part of the region where the intensity of the LP01 mode is larger than at least one of the intensities of the LP02 mode and the LP03 mode.

Next, the operation of the optical fiber amplifier 1 will be described.

First, the seed light from the seed light source 10 is output from the single mode fiber 15. The wavelength of the seed light is, for example, 1070 μm as described above. At this time, only the LP01 mode propagates according to the above constitution of the single mode fiber 15. Then, the light in the LP01 mode propagating through the single mode fiber 15 is input to the optical combiner 30.

The pumping light pumping the active element Yb added to the core 51 of the amplification optical fiber 50 is output from the pumping light source 20. The wavelength at this time is, for example, 915 μm as described above. The pumping light output from the pumping light source 20 propagates through the multi-mode fiber 22 to be input to the optical combiner 30.

The seed light and the pumping light input to the optical combiner 30 are input to the amplification optical fiber 50. The seed light propagates through the core 51 of the amplification optical fiber 50, and the pumping light propagates through the clad 52 and the core 51 of the amplification optical fiber 50. Although the seed light is input mainly as the LP01 mode, the core 51 of the amplification optical fiber 50 may propagate light of the wavelength of the seed light as the LP01 mode, the LP02 mode, and the LP03 mode. Therefore, when the LP01 mode is input, the LP02 mode and the LP03 mode are excited, and the seed light propagates as the LP01 mode, the LP02 mode, and the LP03 mode. When the pumping light passes through the core 51, the active element Yb added to the core 51 is pumped. The pumped active element Yb is induced and emitted by the seed light, and the induction emission amplifies the seed light in the LP01 mode, the LP02 mode, and the LP03 mode.

At this time, the concentration of the active element Yb in the outer peripheral region 57 of the core 51 is higher than the concentration of the active element Yb in the center region 55 including the central portion of the core 51, and the formulae (1) and (2) are satisfied. Thus, as the entire core 51, the LP01 mode is amplified at a higher amplification factor than the LP02 mode and the LP03 mode. Especially in the region A where the intensities of the LP02 mode and the LP03 mode are larger than the intensity of the LP01 mode, since the active element Yb is added at a low concentration, the amplification of the light in the LP02 mode and the LP03 mode is suppressed.

As the entire core 51, the seed light in which the LP01 mode is amplified at a higher amplification factor than the LP02 mode and the LP03 mode is output as output light from the amplification optical fiber 50. Accordingly, in the output light, the power in the LP02 mode and the LP03 mode is kept low, and the power in the LP01 mode is high. Thus, the output light with a good beam quality is output.

As described above, in the amplification optical fiber 50 of this embodiment, since the active element is added at a low concentration at the central portion of the core 51 where the intensities of the LP02 mode and the LP03 mode are large, the amplification of the LP02 mode and the LP03 mode is suppressed. In the outer peripheral region 57 to which the active element Yb is added at a higher concentration than the central portion of the core 51, the light is amplified larger than the central portion of the core 51. The region where the light is strongly amplified includes more regions where the intensity of the LP01 mode is larger than at least one of the intensities of the LP02 mode and the LP03 mode. Since as a whole the additive concentration distributions in the boundary between the center region and the outer peripheral region and each of the regions are set so as to satisfy the formulae (1) and (2), as the entire core 51, the LP01 mode is amplified at a higher amplification factor than the LP02 mode and the LP03 mode. Since the LP01 mode is amplified at a high amplification factor in this manner, the beam quality of output light can be improved.

That is, when the amplification optical fiber 50 according to this embodiment is compared with a fiber in which the active element Yb is added to the core 51 at a uniform concentration, the light with a good beam quality, in which the intensity of the LP01 mode is larger than the intensities of the LP02 mode and the LP03 mode, can be output. Accordingly, the optical fiber amplifier 1 of this embodiment using the amplification optical fiber 50 can output the light with a good beam quality.

In the optical fiber amplifier 1 of this embodiment, the single mode light constituted of the LP01 mode is input as the seed light to the amplification optical fiber 50, and therefore, the power of the excited LP02 mode and the excited LP08 mode can be kept low, so that the LP01 mode can be amplified larger. Accordingly, the light with a high beam quality can be output.

Second Embodiment

Figure 4:
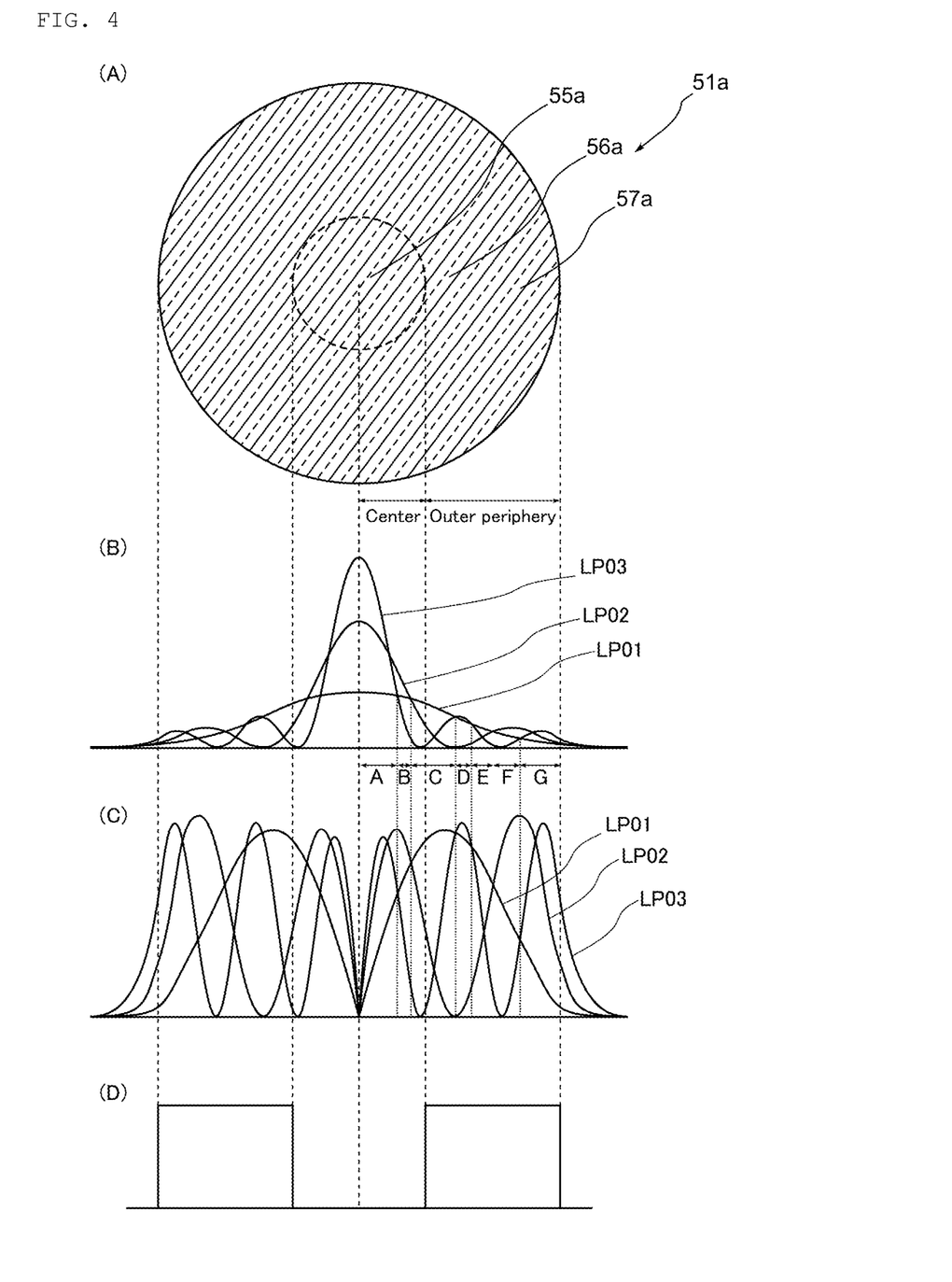
FIG. 4 is a view showing a state of a core of an amplification optical fiber according to a second embodiment of the invention.

Next, a second embodiment of the invention will be described in detail with reference to FIG. 4. The components same as or corresponding to those of the first embodiment are assigned the same reference numerals except for the cases to be described especially, and overlapping descriptions thereof are omitted. FIG. 4 is a view showing a state of a core of an amplification optical fiber according to the second embodiment of the invention and corresponds to FIG. 3 of the first embodiment.

As shown in FIG. 4A, the amplification optical fiber in this embodiment uses a core 51a instead of the core 51 of the amplification optical fiber 50 of the first embodiment. The core 51a is separated into a center region 55a and an outer peripheral region 57a as with the core 51 of the first embodiment separated into the center region 55 and the outer peripheral region 57. As shown in FIG. 4D, an active element is added to the outer peripheral region 57a at a concentration similar to the outer peripheral region 57 of the core 51 of the first embodiment. However, the core 51a of the amplification optical fiber of this embodiment is different from the core 51 of the amplification optical fiber 50 of the first embodiment in that the active element is not added to the center region 55a. The addition of the active element to the core 51a is set so as to satisfy the relation of the formulae (1) and (2) as in the first embodiment.

In the amplification optical fiber of this embodiment, since the active element is not added to the center region 55a of the core 51a, the LP02 mode and the LP03 mode are not amplified in the center region 55a including a region A where the intensities of the LP02 mode and the LP03 mode are large. As in the first embodiment, light is amplified in the outer peripheral region 57a including a part of a region C where the intensity of the LP01 mode is larger than the intensities of the LP02 mode and the LP03 mode, a region E, a region where the intensity of the LP01 mode is larger than one of the intensities of the LP02 mode and the LP03 mode, and a region F. As described above, since the active element is added to the core 51a so as to satisfy the formulae (1) and (2), as the entire core 51a, the LP01 mode is amplified at a higher amplification factor than the LP02 mode and the LP03 mode.

According to the amplification optical fiber of this embodiment, since the active element is not added to the central portion of the core where the intensities of the LP02 mode and the LP03 mode are large, the LP02 mode and the LP03 mode are not amplified at the central portion of the core. Accordingly, as the entire core 51a, since the LP01 mode can be amplified at a higher amplification factor than the LP02 mode and the LP03 mode, the beam quality of the output light can be further improved. Accordingly, by using the amplification optical fiber of this embodiment, an optical fiber amplifier which can output light with a better beam quality can be provided.

Third Embodiment

Figure 5:
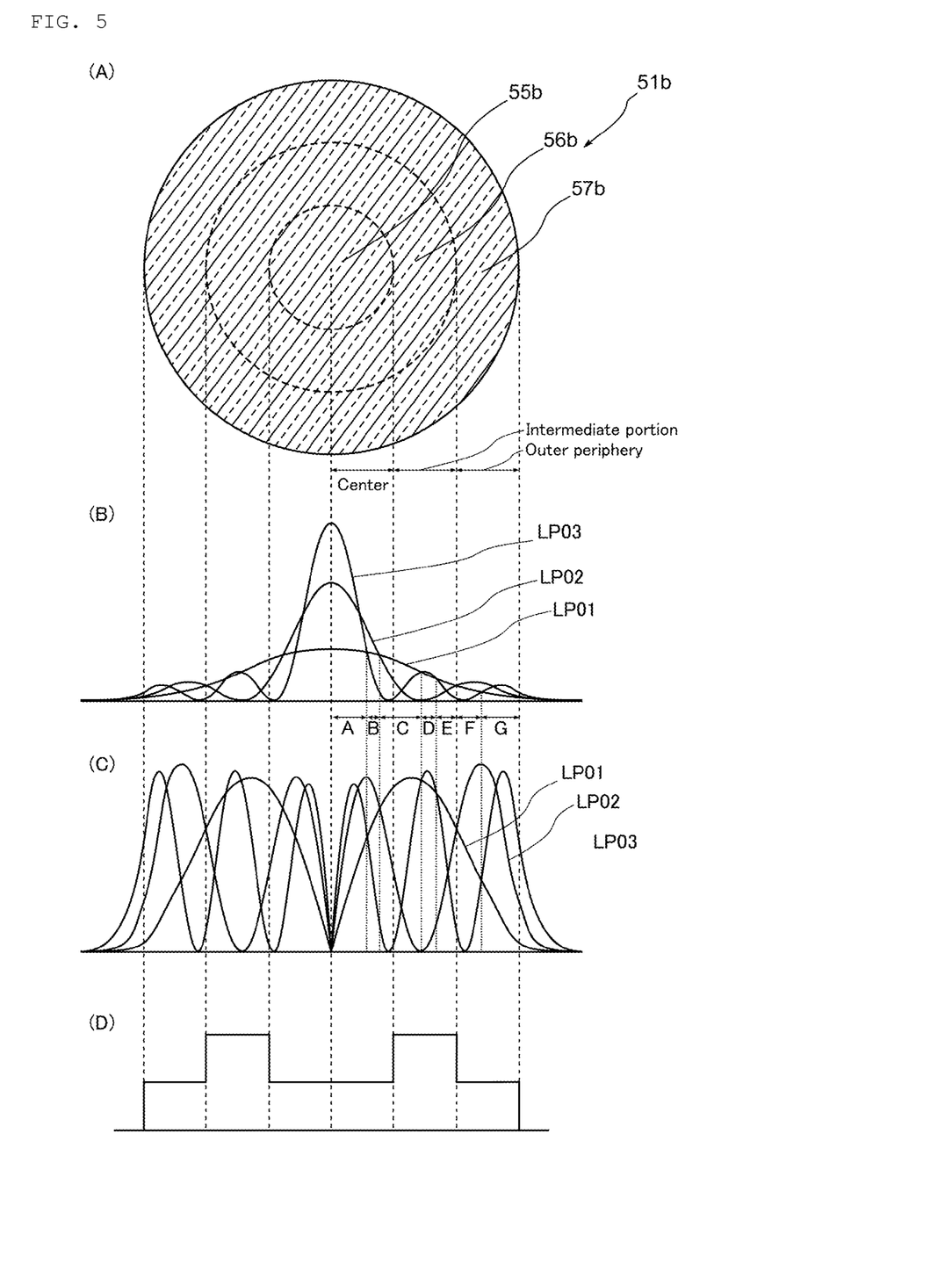
FIG. 5 is a view showing a state of a core of an amplification optical fiber according to a third embodiment of the invention.

Next, the third embodiment of the invention will be described in detail with reference to FIG. 5. The components same as or corresponding to those of the first embodiment are assigned the same reference numerals, and overlapping descriptions thereof are omitted except for the cases to be described especially. FIG. 5 is a view showing a state of a core of an amplification optical fiber according to the third embodiment of the invention and corresponds to FIG. 3 of the first embodiment.

As shown in FIG. 5A, the amplification optical fiber in this embodiment uses a core 51b instead of the core 51 of the amplification optical fiber 50 of the first embodiment. While the core 51 of the first embodiment is separated into the center region 55 and the outer peripheral region 57, the core 51b has an intermediate region 56b provided between a center region 55b and an outer peripheral region 57b. The diameter of the center region 55b and the concentration of the active element added to the center region 55b are similar to those in the center region 55 of the first embodiment. Accordingly, a boundary between the center region 55b and the intermediate region 56b is included in a region C as in the first embodiment. As shown in FIG. 5D, the active element is added to the intermediate region 56b at a concentration similar to the outer peripheral region 57 of the core 51 of the first embodiment, and a boundary between the intermediate region 56b and the outer peripheral region 57b is approximately equal to a boundary between a region E and a region F. In the core 51b of the amplification optical fiber of this embodiment, the additive concentration of the active element in the outer peripheral region 57b is lower than the additive concentration of the active element in the outer peripheral region 57 of the first embodiment. Accordingly, the concentration of the active element in the outer peripheral region 57b is lower than the concentration of the active element in the intermediate region 56b. In the present embodiment, the additive concentration of the active element in the outer peripheral region 57b is similar to the additive concentration of the active element in the center region 55b. When the LP01 mode, the LP02 mode, and the LP03 mode are standardized by power, the additive concentration of the active element Yb in the regions C and E where the intensity of the LP01 mode is larger than the intensities of the LP02 mode and the LP03 mode is higher than the additive concentration of the active element Yb in the center region 55b at the center portion of the active core and the outer peripheral region including an outer peripheral portion of the core.

The active element is added as described above, whereby also in this embodiment, the core 51b is set so as to satisfy the relation of the formulae (1) and (2).

In the amplification optical fiber of this embodiment, since the concentration of the active element in the center region 55b and the outer peripheral region 57b of the core 51b where the intensities of the LP02 mode and the LP03 mode are larger than the intensity of the LP01 mode is kept low, the amplification of the LP02 mode and the LP03 mode is suppressed in the center region 55b and the outer peripheral region 57b including the regions A and G where the intensities of the LP02 mode and the LP03 mode are large. As in the first embodiment, the LP01 mode is amplified at a high amplification factor in the intermediate region 56b including a part of the region C and the region E where the intensity of the LP01 mode is larger than the intensities of the LP02 mode and the LP03 mode and the region D where the intensity of the LP01 mode is larger than the intensity of the LP02 mode.

According to the amplification optical fiber of this embodiment, the amplification of the LP02 mode and the LP03 mode can be suppressed in the center region 55b and the outer peripheral region 57b. As described above, since the active element is added to the core 51b so as to satisfy the formulae (1) and (2), as the entire core 51b, the LP01 mode can be amplified at a higher amplification factor than the LP02 mode and the LP03 mode, and therefore, the beam quality of the output light can be further improved. Accordingly, by using the amplification optical fiber of this embodiment, an optical fiber amplifier which can output light with a better beam quality can be provided.

Fourth Embodiment

Figure 6:
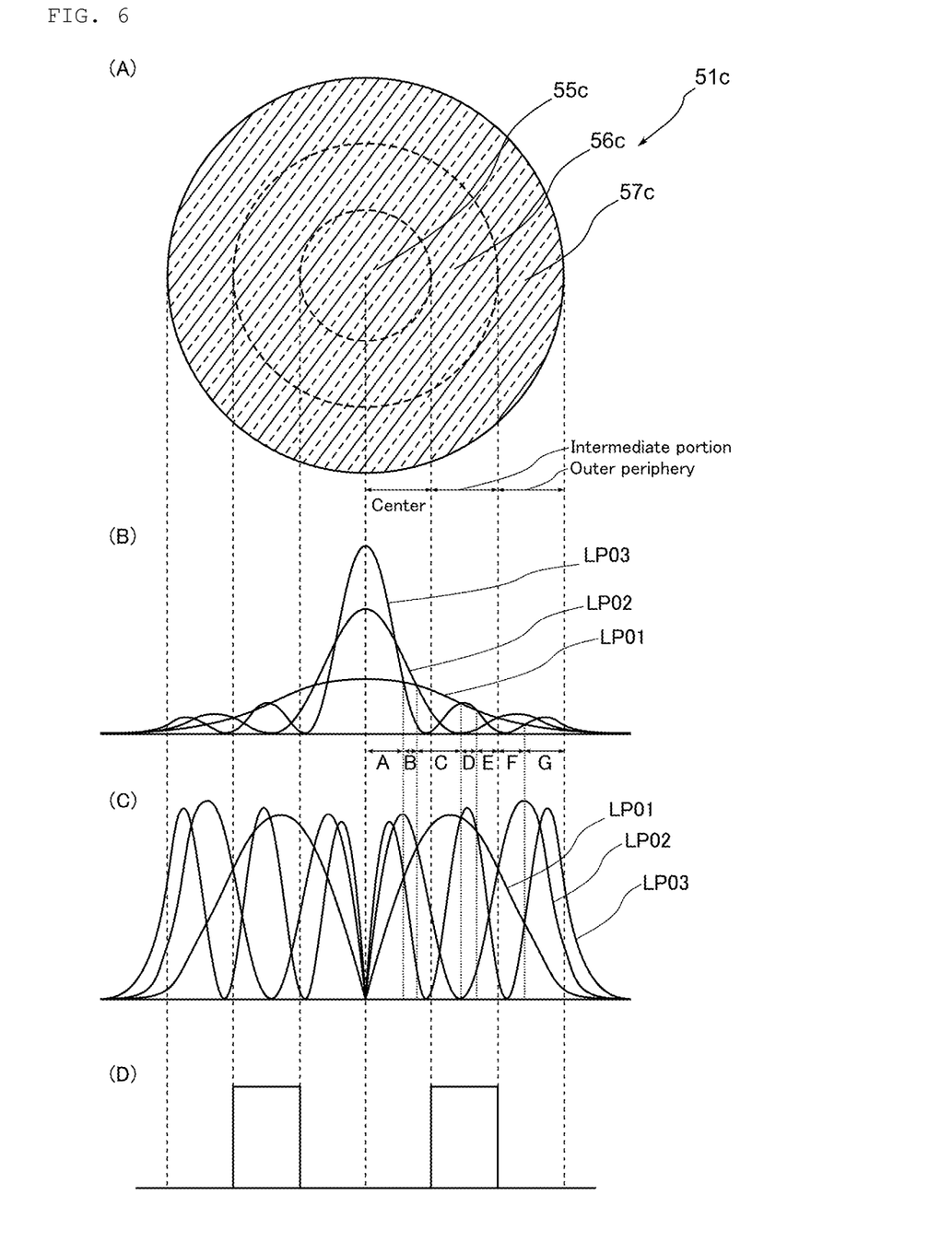
FIG. 6 is a view showing a state of a core of an amplification optical fiber according to a fourth embodiment of the invention.

Next, the fourth embodiment of the invention will be described in detail with reference to FIG. 6. The components same as or corresponding to those of the third embodiment are assigned the same reference numerals, and overlapping descriptions thereof are omitted except for the cases to be described especially. FIG. 6 is a view showing a state of a core of an amplification optical fiber according to the fourth embodiment of the invention and corresponds to FIG. 3 of the first embodiment.

As shown in FIG. 6A, the amplification optical fiber of this embodiment uses a core 51c instead of the core 51b of the amplification optical fiber of the third embodiment. The core 51c is separated into a center region 55c, an intermediate region 56c, and an outer peripheral region 57c as with the core 51b of the third embodiment separated into the center region 55b, the intermediate region 56b, and the outer peripheral region 57b. As shown in FIG. 6D, an active element is added to the intermediate region 56c at a concentration similar to the intermediate region 56b of the core 51b of the third embodiment. However, the core 51c of the amplification optical fiber of this embodiment is different from the core 51b of the third embodiment in that the active element is not added to the center region 55c and the outer peripheral region 57c. Accordingly, when the LP01 mode, the LP02 mode, and the LP03 mode are standardized by power, the additive concentration of the active element Yb in the regions C and E where the intensity of the LP01 mode is larger than the intensities of the LP02 mode and the LP03 mode is higher than the additive concentration of the active element Yb in the center region 55b at the center portion of the active core and the outer peripheral region which is an outer peripheral portion of the core.

The active element is added as described above, whereby also in this embodiment, the core 51c is set so as to satisfy the relation of the formulae (1) and (2).

In the amplification optical fiber of this embodiment, since the active element is not added to the center region 55c and the outer peripheral region 57c of the core 51c where the intensities of the LP02 mode and the LP03 mode are larger than the intensity of the LP01 mode, the LP02 mode and the LP03 mode are not amplified in the center region 55c and the outer peripheral region 57c including the regions A and G where the intensities of the LP02 mode and the LP03 mode are large. As in the third embodiment, the LP01 mode is amplified at a higher amplification factor in the intermediate region 56c including a part of the region C and the region E where the intensity of the LP01 mode is larger than the intensities of the LP02 mode and the LP03 mode and the region D where the intensity of the LP01 mode is larger than the intensity of the LP02 mode.

According to the amplification optical fiber of this embodiment, the LP02 mode and the LP03 mode are not amplified in the center region 55c and the outer peripheral region 57c. As described above, since the active element is added to the core 51c so as to satisfy the formulae (1) and (2), as the entire core 51c, the LP01 mode can be amplified at a higher amplification factor than the LP02 mode and the LP03 mode, and therefore, the beam quality of the output light can be further improved. Accordingly, by using the amplification optical fiber of this embodiment, an optical fiber amplifier which can output light with a better beam quality can be provided.

Fifth Embodiment

Figure 7:
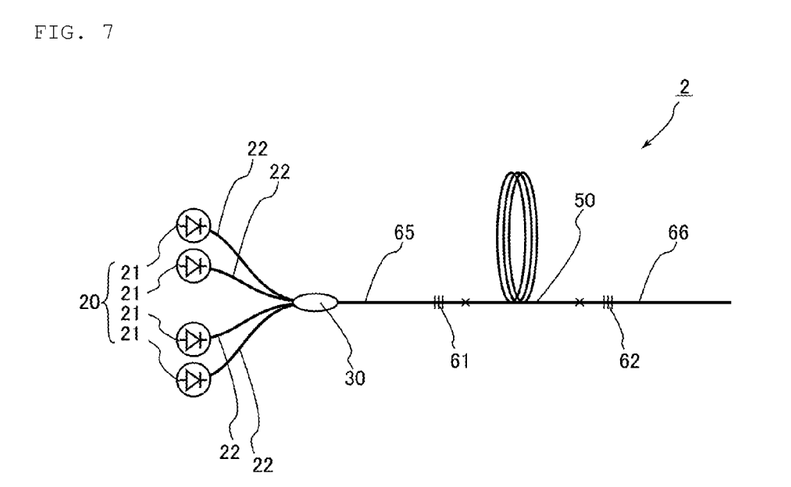
FIG. 7 is a view showing a resonator according to a fifth embodiment of the invention.

Next, the fifth embodiment of the invention will be described in detail with reference to FIG. 7. The components same as or corresponding to those of the first embodiment are assigned the same reference numerals, and overlapping descriptions thereof are omitted except for the cases to be described especially. FIG. 7 is a view showing a resonator according to the fifth embodiment of the invention.

As shown in FIG. 7, a resonator 2 of this embodiment mainly includes a pumping light source 20, an amplification optical fiber 50, an optical combiner 30, a double-clad fiber 65 provided between the amplification optical fiber 50 and the optical combiner 30, a first FBG 61 provided at the double-clad fiber 65, a multi-mode fiber 66 provided on the opposite side of the double-clad fiber 65 of the amplification optical fiber 50, and a second FBG 62 provided at the multi-mode fiber 66.

In the double-clad fiber 65, the structure of a cross-section vertical to the longitudinal direction is similar to that of the amplification optical fiber, and the double-clad fiber 65 is constituted of a core, a clad covering the core, and an external clad covering the clad. Although the outer diameter, the refractive index, and the like of the core, the clad, and the external clad of the double-clad fiber 65 are substantially similar to those of the core, the clad, and the external clad of the amplification optical fiber 50, the active element is not added to the core of the double clad fiber 65. In the first embodiment, the amplification optical fiber 50 is connected to the optical combiner 30. Similarly, one end of the double clad fiber 65 is connected to the optical combiner 30, and the core of the multi-mode fiber 22 and the clad of the double-clad fiber 65 are optically connected. The other end of the double-clad fiber 65 is connected to the amplification optical fiber 50. The core of the double-clad fiber 65 and the core 51 of the amplification optical fiber 50 are connected. The clad of the double-clad fiber 65 and the clad 52 of the amplification optical fiber 50 are connected.

The core of the double-clad fiber 65 has the first FBG 61. Thus, the first FBG 61 is provided on one side of the amplification optical fiber 50. In the first FBG 61, portions where the refractive index becomes high at a certain period are repeated along the longitudinal direction of the double-clad fiber 65. The period is adjusted, whereby at least a portion of the wavelength of light emitted by the active element of the amplification optical fiber 50 in a pumped state is reflected. In the first FBG 61, when the active element is Yb as described above, the refractive index is 100% at 1070 nm, for example.

In the multi-mode fiber 66 provided on the opposite side of the double-clad fiber 65 of the amplification optical fiber 50, as in the amplification optical fiber 50, the diameter of the core and the refractive index of the core and the clad are set so that the LP01 mode, the LP02 mode, and the LP03 mode propagate thorough the multi-mode fiber 66. One end of the multi-mode fiber 66 is connected to the amplification optical fiber 50, and the other end is not connected to anything and is a free end. The core 51 of the amplification optical fiber 50 and the core of the multi-mode fiber 66 are connected with each other.

The core of the multi-mode fiber 66 has the second FBG 62. Thus, the second FBG 62 is provided on the other side of the amplification optical fiber 50. In the second FBG 62, portions where the refractive index becomes high at a certain period are repeated along the longitudinal direction of the multi-mode fiber 66, and light of the same wavelength as the light reflected by the first FBG 61 is reflected at a lower reflectance than the first FBG 61. For example, light of the same wavelength as the light reflected by the first FBG 61 is reflected at a reflectance of 50%.

In the resonator 2, when the pumping light is output from each laser diode 21 of the pumping light source 20, the pumping light is input to the clad of the double-clad fiber 65 in the optical combiner 30 to be input from the clad of the double-clad fiber 65 to the clad of the amplification optical fiber 50. As in the first embodiment, the active element added to the core 51 of the amplification optical fiber 50 is in a pumped state. The active element in the pumped state emits spontaneous emission light of a specified wavelength. The spontaneous emission light at this time is, for example, light having a certain band at a center wavelength of 1070 nm. The spontaneous emission light propagates through the core 51 of the amplification optical fiber 50 to be reflected by the first FBG 61 provided at the core of the double-clad fiber 65. The reflected light is reflected by the second FBG 62, and light resonance occurs. When light propagates through the core 51 of the amplification optical fiber 50, the light is amplified, and a portion of the light transmits through the second FBG to be output from the multi-mode fiber 66.

Also in this embodiment, when light propagates through the core 51 of the amplification optical fiber 50, the light in the LP01 mode is amplified larger than the light in the LP02 mode. Therefore, in comparison with a case of using a fiber in which the active element Yb is added to the core 51 at a uniform concentration, light with a good beam quality in which the light intensity of the LP01 mode is larger than the light intensity of the LP02 mode can be output.

In this embodiment, although the amplification optical fiber 50 of the first embodiment is used as the amplification optical fiber, the amplification optical fiber 50 described in the second to fourth embodiments may be used.

While the invention has been described with reference to the first to fifth embodiments, the invention is not limited thereto.

For example, in the above embodiments, the additive concentration distribution of the active element in the core satisfies the relation of the formulae (1) and (2). However, as long as at least one of the formulae (1) and (2) is satisfied, the LP01 mode can be amplified at a higher amplification factor than one of the LP02 mode and the LP03 mode. Compared with the conventional technique, any of the ratio between the LP01 mode and the LP02 mode and the ratio between the LP01 mode and the LP03 mode can be increased. Therefore, compared with the conventional amplification optical fiber in which the active element is uniformly added to the entire core, the beam quality of output light can be improved.

In the amplification optical fiber 50 according to each of the above embodiments, the additive concentration of the active element Yb is set in two stages in the center region, the intermediate region, and the outer peripheral region. However, as long as the relation of the formulae (1) and (2) is satisfied, the additive concentration may not be different in two stages, and the distribution may be changed in three or more stages, or the distribution may be changed continuously.

In the third embodiment, the active element may not be added to the outer peripheral region 57b, or in the third embodiment, the active element may not be added to the center region 55b. Also in this constitution, regarding the input light, the LP01 mode is amplified at a higher amplification factor than the LP02 mode and the LP03 mode, and therefore, light with a good beam quality can be output.

In the third embodiment, as long as at least one of the formulae (1) and (2) is satisfied, the active elements with different concentrations may be added to the center region 55b and the outer peripheral region 57b.

In the first to fifth embodiments, the additive concentration of the active element is changed based on the center regions 55, 55a, 55b, and 55c, the intermediate regions 56b and 56c, and the outer peripheral regions 57, 57a, 57b, and 57c. However, in the invention, for example, when the LP01 mode, the LP02 mode, and the LP03 mode are standardized by power, in at least a part of the region where the intensity of the LP01 mode is larger than at least one of the intensities of the LP02 mode and the LP03 mode, an active element is added at a higher concentration than the central portion of the core, and at least one of the formulae (1) and (2) may be satisfied. That is, as long as at least one of the formulae (1) and (2) is satisfied, the active element may be added to at least a part of the regions B to F at a higher concentration than the center of the core. Also in this case, the LP01 mode is amplified at a higher amplification factor than at least one of the LP02 mode and the LP03 mode, and therefore, in comparison with the case where the active element is uniformly added to the entire core, the beam quality of output light can be improved.

In the invention, as long as the formulae (1) and (2) are satisfied, when the LP01 mode, the LP02 mode, and the LP03 mode are standardized by power, in all the regions where the intensity of the LP01 mode is larger than the intensities of the LP02 mode and the LP03 mode, the active element may be added at a higher concentration than the central portion of the core. That is, in the above embodiments, in the entire regions C and E, the active element may be added at a higher concentration than the central portion of the core. The active element is added in this manner, whereby the LP01 mode can be amplified at a higher amplification factor than the LP02 mode and the LP03 mode. In this case, the concentration of the active element in the region where the intensity of the LP01 mode is larger than the intensities of the LP02 mode and the LP03 mode may be higher than the concentration of the active element in all the other regions. The active element may not be added to all the other regions. That is, the concentration of the active element in the regions C and E may be higher than the concentration of the active element in the regions other than the regions C and E, and the active element may not be added to the regions other than the regions C and E. The active element is added in this manner, whereby the LP01 mode can be amplified at a higher amplification factor than the LP02 mode and the LP03 mode. Accordingly, the beam quality of output light can be further enhanced.

In the invention, as long as the formulae (1) and (2) are satisfied, when the LP01 mode, the LP02 mode, and the LP03 mode are standardized by power, in all the regions where the intensity of the LP01 mode is larger than at least one of the intensities of the LP02 mode and the LP03 mode, the active element may be added to the core at a higher concentration than the central portion of the core. That is, in all the regions B to F, the active element may be added at a higher concentration than the center of the core. In this case, the active element may not be added in regions other than the region where the intensity of the LP01 mode is larger than at least one of the intensities of the LP02 mode and the LP03 mode. That is, the active element may not be added in the regions other than the regions B to F (the regions A and G). The active element is added in this manner, whereby the LP01 mode can be always amplified at a higher amplification factor than the LP02 mode and the LP03 mode. Accordingly, the beam quality of output light can be increased the most.

In the first to fourth embodiments, although the amplification optical fiber has a constitution in which the higher-order modes of LP03 or more among the light input to a core do not propagate, the higher-order modes of LP03 or more may propagate through the amplification optical fiber.

In the first to fifth embodiments, the forward pumping configuration in which the pumping light is input from the end surface on the opposite side of the output end side of the amplification optical fiber has been described as an example. However, there may be adopted a backward pumping configuration in which an optical combiner for pumping light is provided on the output end side of the amplification optical fiber, and the pumping light is input from the end surface on the output end side of the amplification optical fiber.

As the optical fiber connected to the seed light source 10, a multi-mode fiber is used, and the multi-mode light may be input to the amplification optical fiber. At this time, the multi mode fiber is used as a fiber for seed light propagation of an optical combiner, and a central axis of the multi-mode fiber connected to the seed light source and a central axis of the fiber for seed light propagation of the optical combiner substantially coincide with each other to be fusion spliced. According to this constitution, the multi-mode fiber propagates an axisymmetric mode, and seed light input to the amplification optical fiber becomes light constituted of the axisymmetric mode, whereby the seed light input to the amplification optical fiber includes only an axisymmetric higher-order mode in addition to the LP01 mode. Thus, in comparison with a case where the seed light input to the amplification optical fiber includes a nonaxisymmetric higher-order mode, easily collectable light with a good beam quality can be output. As an example of the multi-mode fiber, there may be used a multi-mode fiber through which the LP01 mode, the LP02 mode, the LP03 mode propagate, and the higher-order modes of LP04 mode or more do not propagate. In such a multi-mode fiber, when light propagating through a core is 1070 μm, the diameter of the core is 30 μm, and the relative refractive index difference between the core and a clad may be 0.32%.

The optical fiber amplifier 1 and the resonator 2 described in the above embodiment can be used as it is as a fiber laser device.

EXAMPLES

Hereinafter, the contents of the invention will be described more specifically with reference to Examples and Comparative Examples. However, the invention is not limited thereto.

Example 1

In order to verify the quality of output beam by simulation, an amplification optical fiber similar to that of the second embodiment is assumed. In the amplification optical fiber of this example, the diameter of the core is 30 μm, the outer diameter of the clad is 420 μm, and the outer diameter of the outer clad is 440 μm. The relative refractive index difference between the core and the clad is 0.32. In the following examples, each length of the amplification optical fibers is set so that amplification efficiency is the highest under the largest pumping light power condition.

As in the second embodiment, in the radial direction of the core, the core is separated into a center region around the center of the core and having a diameter of 10 μm and an outer peripheral region surrounding the center region and ranging to an outer peripheral surface of the core. Yb of $16 \times 10^{25}$ (pieces/m$^3$) is added to the outer peripheral region, and no active element is added to the center region.

Next, a single mode fiber through which light enters the amplification optical fiber is assumed. In the single mode fiber, the diameter of the core is 10 μm, core Δ is 0.16%, and the outer diameter of the clad is 125 μm. With regard to the ratio of the power in each mode in light propagating through the single mode fiber, the ratio in the LP01 mode is 62%, the ratio in the LP02 mode is 31.5%, and the ratio in the LP03 mode is 6.5%.

Then, light enters the amplification optical fiber through the single mode fiber. At this time, the profiles of the LP01 mode, the LP02 mode, and the LP03 mode are substantially similar to those of FIGS. 4B and 4C. Accordingly, the intermediate region and the outer peripheral region to which Yb is added include a region where the intensity of the LP01 mode is larger than at least one of the intensities of the LP02 mode and the LP03 mode. Further, the amplification optical fiber satisfies the relation of the formulae (1) and (2).

Example 2

As in the fourth embodiment, in the radial direction of the core, the core is separated into a center region similar to that of the first embodiment, an intermediate region surrounding the center region and having the outer diameter of 20 μm, and an outer peripheral region ranging from the intermediate region to an outer peripheral surface of the core. In Example 2, an amplification optical fiber similar to the amplification optical fiber of Example 1 is assumed, except that Yb of $16 \times 10^{25}$ (pieces/m$^3$) is added to the intermediate region, and no active element is added to the center region and the outer peripheral region. Further, a single mode fiber similar to the single mode fiber of Example 1 is assumed.

As in the first embodiment, light enters the amplification optical fiber through the single mode fiber. At that time, the profiles of the LP01 mode, the LP02 mode, and the LP03 mode are similar to those of the first embodiment. Accordingly, the intermediate region to which Yb is added includes the region where the intensity of the LP01 mode is larger than at least one of the intensities of the LP02 mode and the LP03 mode. Further, the amplification optical fiber satisfies the relation of the formulae (1) and (2).

Comparative Example 1

In Comparative Example 1, an amplification optical fiber similar to the amplification optical fiber of Example 1 is assumed, except that Yb of $16 \times 10^{25}$ (pieces/m$^3$) is uniformly added to the entire core, and a single mode fiber similar to the single mode fiber of Example 1 is assumed.

As in Example 1, light enters the amplification optical fiber through the single mode fiber. The amplification optical fiber does not satisfy the relation of the formulae (1) and (2).

Next, when the intensity of the power of light, input from the single mode fiber of Examples 1 and 2 and Comparative Example 1 to the amplification optical fiber, is 200 mW, the pumping light is input to the clad of the amplification optical fiber. When the power of the pumping light is changed to 10 W, 30 W, 50 W, and 70 W, the output power of output light and the beam quality M$^2$ are obtained by calculation. The beam quality M$^2$ is defined as the following formula by a wavelength λ, a spread angle Θ of the output light, and a beam diameter D:

$$M^2 = \frac{\Theta \times D \times \pi}{4 \times \lambda}$$

Figure 8:
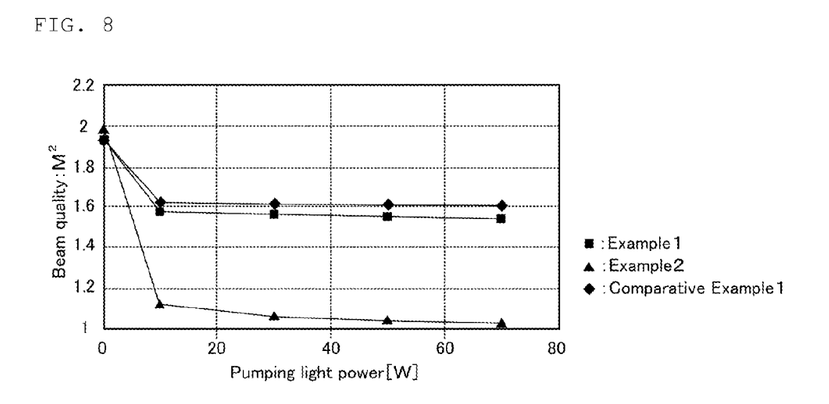
FIG. 8 is a view showing a beam quality of output light in Examples 1 and 2 and Comparative Example 1.

The result is shown in FIG. 8. As shown in FIG. 8, in Example 1, M$^2$ representing the beam quality has a lower numeric value than Comparative Example 1 in the power of any pumping light, and light with a good beam quality is output. In Example 2, light with a better beam quality is output. In the power of any pumping light, there is no difference in the output power between Examples 1 and 2 and Comparative Example 1.

Example 3

In Example 3, an amplification optical fiber similar to the amplification optical fiber of Example 1 is assumed, and instead of the single mode fiber of Example 1, a single mode fiber in which the diameter of the core is 15 μm, the core Δ is 0.07%, and the outer diameter of the clad is 125 μm is assumed. With regard to the ratio of the power in each mode in light propagating through the single mode fiber, the ratio in the LP01 mode is 89.8%, the ratio in the LP02 mode is 9.8%, and the ratio in the LP03 mode is 0.4%.

As in Example 1, light enters the amplification optical fiber through the single mode fiber. At this time, the profiles of the LP01 mode, the LP02 mode, and the LP03 mode are substantially similar to those of FIGS. 4B and 4C. Accordingly, the outer peripheral region to which Yb is added includes the region where the intensity of the LP01 mode is larger than at least one of the intensities of the LP02 mode and the LP03 mode. Further, the amplification optical fiber satisfies the relation of the formulae (1) and (2).

Example 4

In Example 4, an amplification optical fiber similar to the amplification optical fiber of Example 2 is assumed, and instead of the single mode fiber of Example 2, a single mode fiber similar to the single mode fiber of Example 3 is assumed.

As in Example 2, light enters the amplification optical fiber through the single mode fiber. At this time, the profiles of the LP01 mode, the LP02 mode, and the LP03 mode are substantially similar to those of Example 3. Accordingly, the intermediate region to which Yb is added includes a region where the intensity of the LP01 mode is larger than the intensities of the LP02 mode and the LP03 mode. Further, the amplification optical fiber satisfies the relation of the formulae (1) and (2).

Comparative Example 2

In Comparative Example 2, an amplification optical fiber similar to the amplification optical fiber of Example 3 is assumed, except that Yb of $16 \times 10^{25}$ (pieces/m$^3$) is uniformly added to the entire core, and a single mode fiber similar to the single mode fiber of Example 3 is assumed.

As in Example 3, light enters the amplification optical fiber through the single mode fiber. The amplification optical fiber does not satisfy the relation of the formulae (1) and (2).

Next, when the intensity of the power of light, input from the single mode fiber of Examples 3 and 4 and Comparative Example 2 to the amplification optical fiber is 200 mW, the pumping light is input to the clad of the amplification optical fiber. When the power of the pumping light is changed to 10 W, 30 W, 50 W, and 70 W, the output power and the beam quality ($M^2$) of output light are obtained by calculation.

Figure 9:
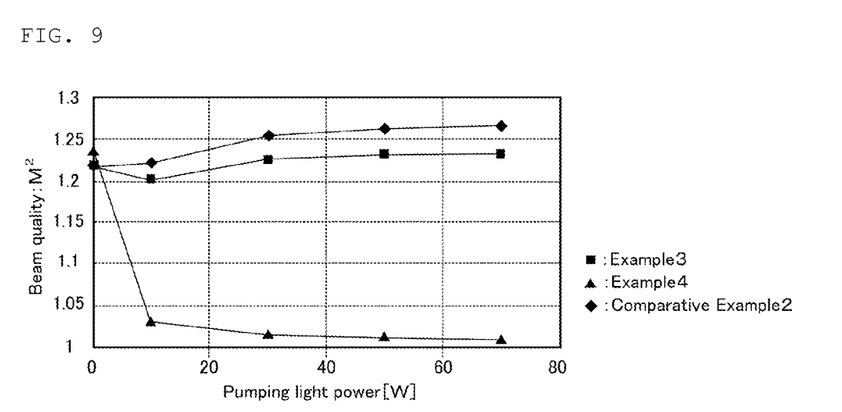
FIG. 9 is a view showing a beam quality of output light in Examples 3 and 4 and Comparative Example 2.

The result is shown in FIG. 9. As shown in FIG. 9, in Example 3, $M^2$ representing the beam quality has a lower numeric value than Comparative Example 2 in the power of any pumping light, and light with a good beam quality is output. In Example 4, light with a better beam quality is output. In the power of any pumping light, there is no difference in the output power between Examples 3 and 4 and Comparative Example 2.

Example 5

An amplification optical fiber similar to the amplification optical fiber of Example 1 is assumed, and instead of the single mode fiber of Example 1, a single mode fiber in which the diameter of the core is 20 μm, the core Δ is 0.04%, and the outer diameter of the clad is 125 μm is assumed. With regard to the ratio of the power in each mode in light propagating through the single mode fiber, the ratio in the LP01 mode is 99.4%, the ratio in the LP02 mode is 0.4%, and the ratio in the LP03 mode is 0.2%.

As in Example 1, light enters the amplification optical fiber through the single mode fiber. At this time, the profiles of the LP01 mode, the LP02 mode, and the LP03 mode are substantially similar to those of FIGS. 4E and 4C. Accordingly, the outer peripheral region to which Yb is added includes the region where the intensity of the LP01 mode is larger than the intensities of the LP02 mode and the LP03 mode. Further, the amplification optical fiber satisfies the relation of the formulae (1) and (2).

Example 6

In Example 6, an amplification optical fiber similar to the amplification optical fiber of Example 2 is assumed, and instead of the single mode fiber of Example 2, a single mode fiber similar to the single mode fiber of Example 5 is assumed.

As in Example 2, light enters the amplification optical fiber through the single mode fiber. At this time, the profiles of the LP01 mode, the LP02 mode, and the LP03 mode are substantially similar to those of Example 5. Accordingly, the intermediate region to which Yb is added includes the region where the intensity of the LP01 mode is larger than the intensities of the LP02 mode and the LP03 mode. Further, the amplification optical fiber satisfies the relation of the formulae (1) and (2).

Comparative Example 3

In Comparative Example 3, an amplification optical fiber similar to the amplification optical fiber of Example 5 is assumed, except that Yb of $16 \times 10^{25}$ (pieces/m$^3$) is uniformly added to the entire core, and a single mode fiber similar to the single mode fiber of Example 5 is assumed.

As in Example 5, light enters the amplification optical fiber through the single mode fiber. The amplification optical fiber does not satisfy the relation of the formulae (1) and (2).

Next, when the intensity of the power of light, input from the single mode fiber of Examples 5 and 6 and Comparative Example 3 to the amplification optical fiber, is 200 mW, the pumping light is input to the clad of the amplification optical fiber. When the power of the pumping light is changed to 10 W, 30 W, 50 W, and 70 W, the output power and the beam quality ($M^2$) of output light are obtained by calculation.

Figure 10:
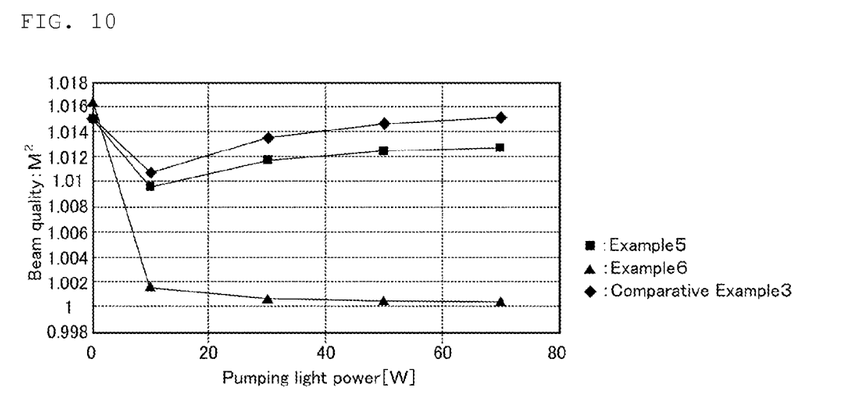
FIG. 10 is a view showing a beam quality of output light in Examples 5 and 6 and Comparative Example 3.

The result is shown in FIG. 10. As shown in FIG. 10, in Example 5, $M^2$ representing the beam quality has a lower numeric value than Comparative Example 3 in the power of any pumping light, and light with a good beam quality is output. In Example 6, light with a better beam quality is output. In the power of any pumping light, there is no difference in the output power between Examples 5 and 6 and Comparative Example 3.

According to the above results, in the amplification optical fiber in which the additive element is not added at the center of the core 51 where the intensities of the LP02 mode and the LP03 mode are large as in the invention, and the formulae (1) and (2) are satisfied, the amplification of the LP02 mode and the LP03 mode is suppressed, and the LP01 mode is amplified at a high amplification factor; therefore, the beam quality of output light can be improved. In the amplification optical fiber in which the active element is not added in the outer peripheral portion of the core, the light beam quality can be further improved.

INDUSTRIAL APPLICABILITY

According to the invention, there are provided an amplification optical fiber, which can output light with a good beam quality even when a higher-order mode is excited, and an optical fiber amplifier and a resonator using the amplification optical fiber.

EXPLANATION OF REFERENCE SIGNS

1 Optical fiber amplifier
2 Resonator
10 Seed light source
11 Laser diode
13 Rare earth added fiber
15 Single mode fiber
20 Pumping light source
21 Laser diode 22 Multi-mode fiber
30 Optical combiner
50 Amplification optical fiber
51, 51a, 51b, 51c Core
52 Clad
53 External clad
55, 55a, 55b, 55c Center region
56b, 56c Intermediate region
57, 57a, 57b, 57c Outer peripheral region
61 First FBG
62 Second FBG

The invention claimed is:

1. An amplification optical fiber, which has a core and a clad covering the core, wherein
the core propagates light with a predetermined wavelength in at least an LP01 mode, an LP02 mode, and an LP03 mode,
when the LP01 mode, the LP02 mode, and the LP03 mode are standardized by power, in at least a part of a region where the intensity of the LP01 mode is larger than at least one of the intensities of the LP02 mode and the LP03 mode, an active element inducing and emitting the light with a predetermined wavelength is added to the core at a higher concentration than a central portion of the core, and
at least one of the following formulae (1) and (2) is satisfied:

$$\int_0^b n(r) \times \{I_{01}(r) - I_{02}(r)\} r \, dr > 0 \qquad (1)$$

$$\int_0^b n(r) \times \{I_{01}(r) - I_{03}(r)\} r \, dr > 0 \qquad (2)$$

(where r represents a distance from the center in the radial direction of the core, $I_{01}(r)$ represents intensity in the distance r from the center in the radial direction of the core in the LP01 mode, $I_{02}(r)$ represents intensity in the distance r from the center in the radial direction of the core in the LP02 mode, $I_{03}(r)$ represents intensity in the distance r from the center in the radial direction of the core in the LP03 mode, n(r) represents an additive concentration of the active element in the distance r from the center in the radial direction of the core, and b represents a radius of the core).

2. The amplification optical fiber according to claim 1, wherein when the LP01 mode, the LP02 mode, and the LP03 mode are standardized by power, in at least a part of a region where the intensity of the LP01 mode is larger than the intensity of the LP02 mode and in at least a part of a region where the intensity of the LP01 mode is larger than the intensity of the LP03 mode, the active element is added to the core at a higher concentration than the central portion of the core, and
the formulae (1) and (2) are satisfied.

3. The amplification optical fiber according to claim 2, wherein when the LP01 mode, the LP02 mode, and the LP03 mode are standardized by power, in at least a part of a region where the intensity of the LP01 mode is larger than the intensities of the LP02 mode and the LP03 mode, the active element is added to the core at a higher concentration than the central portion of the core.

4. The amplification optical fiber according to claim 3, wherein when the LP01 mode, the LP02 mode, and the LP03 mode are standardized by power, in all regions where the intensity of the LP01 mode is larger than the intensities of the LP02 mode and the LP03 mode, the active element is added to the core at a higher concentration than the central portion of the core.

5. The amplification optical fiber according to claim 1, wherein when the LP01 mode, the LP02 mode, and the LP03 mode are standardized by power, in all regions where the intensity of the LP01 mode is larger than at least one of the intensities of the LP02 mode and the LP03 mode, the active element is added to the core at a higher concentration than the central portion of the core, and
the formulae (1) and (2) are satisfied.

6. The amplification optical fiber according to any one of claims 1 to 5, wherein the active element is not added to the central portion of the core.

7. The amplification optical fiber according to any one of claims 1 to 5, wherein in the outer peripheral portion of the core, the concentration of the active element is lower than that in a region where the active element is added at a higher concentration than the central portion of the core.

8. The amplification optical fiber according to claim 7, wherein the active element is not added to the outer peripheral portion of the core.

9. An optical fiber amplifier comprising:
the amplification optical fiber according to any one of claims 1 to 5;
a seed light source which inputs seed light including an LP01 mode to the amplification optical fiber; and
a pumping light source which outputs pumping light pumping the active element of the amplification optical fiber.

10. The optical fiber amplifier according to claim 9, wherein the seed light input to the amplification optical fiber excites only an axisymmetric mode of the amplification optical fiber.

11. The optical fiber amplifier according to claim 10, wherein the seed light input to the amplification optical fiber is single mode light.

12. A resonator comprising:
the amplification optical fiber according to any one of claims 1 to 5;
a pumping light source which outputs pumping light pumping the active element of the amplification optical fiber;
a first FBG which is provided on one side of the amplification optical fiber and reflects light with at least a part of a wavelength of light emitted by the active element pumped by the pumping light; and
a second FBG which is provided on the other side of the amplification optical fiber and reflects light with the same wavelength as the light, reflected by the first FBG, at a lower reflectance than the first FBG.

* * * * *